(12) United States Patent
Domokos et al.

(10) Patent No.: US 8,905,225 B2
(45) Date of Patent: Dec. 9, 2014

(54) DRIVING DEVICE OF A CONVEYOR DEVICE

(71) Applicant: Claas Hungaria KFT., Toeroekszentmiklos (HU)

(72) Inventors: Ferenc Domokos, Bekescsaba (HU); Tibor Szakallas, Nagykoeroes (HU)

(73) Assignee: Claas Hungaria KFT., Toeroekszentmiklos (HU)

( * ) Notice: Subject to any disclaimer, the term of this patent is extended or adjusted under 35 U.S.C. 154(b) by 0 days.

(21) Appl. No.: 14/035,190

(22) Filed: Sep. 24, 2013

(65) Prior Publication Data

US 2014/0090959 A1 Apr. 3, 2014

(30) Foreign Application Priority Data

Sep. 28, 2012 (DE) .......................... 10 2012 109 269

(51) Int. Cl.
*B65G 33/00* (2006.01)
*A01D 75/18* (2006.01)
*A01D 61/00* (2006.01)

(52) U.S. Cl.
CPC .............. *A01D 75/18* (2013.01); *A01D 61/008* (2013.01)
USPC ........................................... 198/670; 56/364

(58) Field of Classification Search
CPC ........ B65G 33/00; B65G 33/24; B65G 33/14; A01D 61/008
USPC ............. 198/657, 670, 671, 672; 56/294, 364
See application file for complete search history.

(56) References Cited

U.S. PATENT DOCUMENTS

| 2,644,292 | A | * | 7/1953 | Oberholtz et al. | ............... | 56/364 |
| 5,813,205 | A | * | 9/1998 | Gosa | ................................ | 56/364 |
| 6,668,534 | B2 | * | 12/2003 | Sheedy et al. | ................... | 56/364 |
| 7,401,457 | B2 | * | 7/2008 | Bich et al. | ......................... | 56/294 |
| 7,426,819 | B2 | * | 9/2008 | Bich et al. | ......................... | 56/364 |
| 8,091,327 | B2 | * | 1/2012 | Batu | ............................... | 56/12.5 |
| 2006/0252472 | A1 | | 11/2006 | Lanzinger | | |
| 2007/0022727 | A1 | * | 2/2007 | Bich et al. | ......................... | 56/364 |
| 2009/0056298 | A1 | * | 3/2009 | Lohrentz et al. | ................ | 56/364 |

FOREIGN PATENT DOCUMENTS

EP 1 712 121 10/2006

* cited by examiner

*Primary Examiner* — James R Bidwell
(74) *Attorney, Agent, or Firm* — Michael J. Striker

(57) ABSTRACT

A driving device of a conveyor device such as an intake finger assembly of an auger of a harvesting device includes a feeder aid disposed in an interior of the conveyor device, a swivel bearing for supporting the feeder aid on a control shaft, a first fastening section assigned to the swivel bearing, and a second fastening section. The second fastening section is disposed at a distance from the first fastening section, between which a predetermined breaking point is disposed on the feeder aid. The first fastening section and the second fastening section are interconnected by a resiliently elastic connecting element.

10 Claims, 4 Drawing Sheets

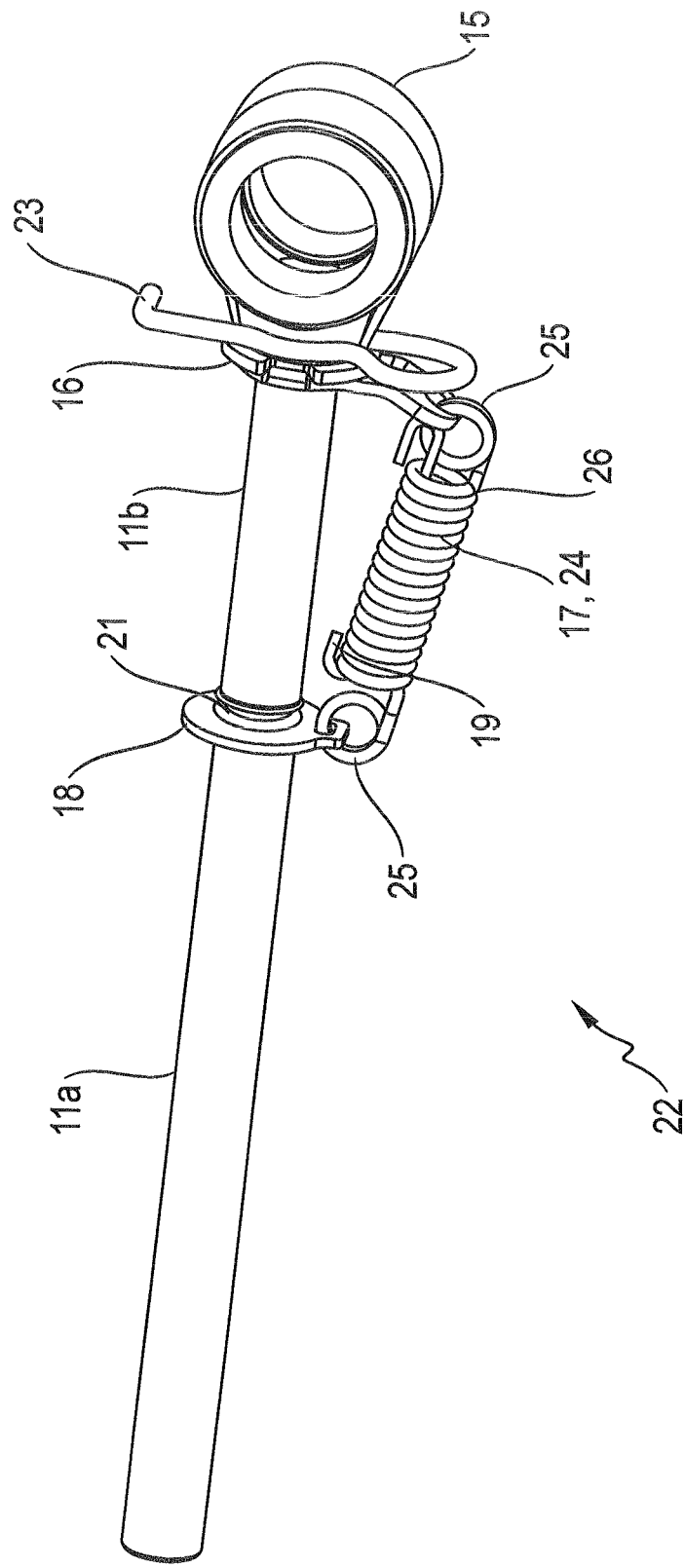

DRIVING DEVICE OF A CONVEYOR DEVICE

CROSS-REFERENCE TO A RELATED APPLICATION

The invention described and claimed hereinbelow is also described in German Priority Document DE 10 2012 109269.9, filed on Sep. 28, 2012. The German Priority Document, the subject matter of which is incorporated herein by reference, provides the basis for a claim of priority of invention under 35 U.S.C. 119(a)-(d).

BACKGROUND OF THE INVENTION

The present invention relates to a driving device of a conveyor device.

Driving devices of conveyor devices are used, in particular, in the region of the harvesting machine where worm conveyors are used to convey crop in the axial direction and in the radial or tangential direction. The driving devices of the conveyor devices comprise feeder aids, which are moved in the radial direction of the conveyor device by means of an eccentric control shaft. The feeder aids therefore protrude from the conveyor device by different extents during the conveying process.

When one of the feeder aids is in the position thereof protruding furthest from the conveyor device and, in a case where the feeder aid so protruding strikes a foreign object picked up with the crop, the feeder aid can break. The greatest bending moment occurs in the region of the wall of the conveyor device. The broken-off part of the feeder aid then generally falls into the crop stream and is transported thereby into the interior of the harvesting machine. Consequently, damage can occur to working assemblies of the harvesting machine, such as threshing, separating, or chopping devices of a combine harvester. Conventional means are known from the prior art that are designed to prevent the sections of the feeder aid from becoming separated if the feeder aid should break.

EP 1 712 121 A1, for example, makes known a driving device for a conveyor device of the initially mentioned type. A feeder aid is described therein, which is disposed on a control shaft in the interior of the conveyor device by means of a swivel bearing. The feeder aid has a predetermined breaking point in the vicinity of the swivel bearing. in the event that the feeder aid breaks, in order to prevent the outer part of the broken feeder aid from dropping into the crop stream, the retaining means (which retain the part of the feeder aid disposed at a distance from the swivel bearing), and the holding means (via which the feeder aid is fastened on the swivel bearing), are designed as one piece.

In order to achieve the one-piece design of the holding means and the retaining means, a cotter pin having a complicated design is used to immobilize the feeder aid on the swivel bearing and enclose the feeder aid above the predetermined breaking point. Therefore, if the feeder aid strikes a foreign object, the feeder aid breaks at the predetermined breaking point instead of becoming deformed. The disadvantage of a feeder aid according to EP 1 712 121 A1 is, in particular, the complicated manufacture of the cotter pin and the special configuration of the swivel bearing that is required to immobilize the feeder aid.

SUMMARY OF THE INVENTION

The present invention overcomes the shortcomings of known arts, such as those mentioned above.

To that end, the present invention provides a driving device for a conveyor device characterized by a reliable retaining function in the event that the feeder aid breaks.

In an embodiment, the driving device for a conveyor device (for example, an intake finger assembly of an auger of a harvesting device), comprises a feeder aid disposed in the interior of the conveyor device, a swivel bearing for supporting the feeder aid on a control shaft, a first fastening section assigned to the swivel bearing, and a second fastening section, which is disposed at a distance from the first fastening section, between which a predetermined breaking point is disposed on the feeder aid.

The first fastening section and the second fastening section are interconnected by a resiliently elastic connecting element. The sections of the feeder aid that are interconnected by the connecting element after the feeder aid has broken at the predetermined breaking point can move freely relative to one another. This ensures that the broken-off section is securely connected to the section of the feeder aid held by the swivel bearing. The broken-off section of the feeder aid is drawn back into the interior within one revolution of the conveyor device, thereby preventing the broken-off section of the feeder aid from being fed to the working assemblies of the harvesting machine along with the crop stream.

Preferably, the connecting element is designed as a helical tension spring. This is a particularly cost-favorable and robust variant of a connecting element. The helical tension spring has eyelets on the ends for connecting the helical tension spring to the first and second fastening elements.

The spring travel of the connecting element is limited using a limiting element. Limiting the spring travel of the connecting element ensures that the outwardly directed travel of the broken-off section of the feeder aid in the radial direction occurring due to centrifugal force is limited during rotation of the conveyor device. This prevents the broken-off section of the feeder aid from protruding from the conveyor device, which would result in elements enclosing the conveyor device in sections, such as the trough of a header. The limiting element also can be used to prevent the connecting element from overstretching due to centrifugal forces, which would impair the functionality thereof.

Preferably, the limiting element has a length that at least corresponds to the length of the section that is effective for a deflection of the connecting element. The section that is effective for the deflection is the part of the resiliently elastic connecting element that undergoes a reversible elongation or deflection due to the action of force. The limiting element preferably has a length that corresponds to the length of the section that is effective for a deflection of the connecting element plus a deflection of the connecting element due to the centrifugal force that acts on the broken-off section of the feeder aid. This allows space for a deflection of the connecting element, wherein this deflection is limited in order to prevent the broken-off section of the feeder aid from protruding from the conveyor device. Moreover, the limiting element exerts an impulse on the broken-off section of the feeder aid in opposition to the centrifugal force, by means of which this broken-off section of the feeder aid is drawn back into the interior of the conveyor device.

In an embodiment of the connecting element as a helical tension spring, the limiting element can enclose the spring coils at least in sections.

Preferably, the limiting element has a substantially C-shaped contour. A fastening element designed in this manner is easily fastened to the connecting element.

Alternatively, the limiting element can have a substantially oval, annular contour. Such a limiting element is characterized by Greater stability and secure fastening to the connecting element.

In a variation, the limiting element is designed as a tension band.

Preferably, the first fastening section is designed as an annular disk disposed coaxially to the driving element. The purpose of the disk is to fasten the tensioning element and to prevent the broken-off section of the feeder aid from escaping to the outside through a guide on the jacket surface of the conveyor device.

BRIEF DESCRIPTION OF THE DRAWINGS

Further features and advantages of the invention will become apparent from the description of embodiments that follows, with reference to the attached figures, wherein:

FIG. 4 presents a perspective view of a second embodiment of a driving device for a conveyor device according to FIG. 2.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
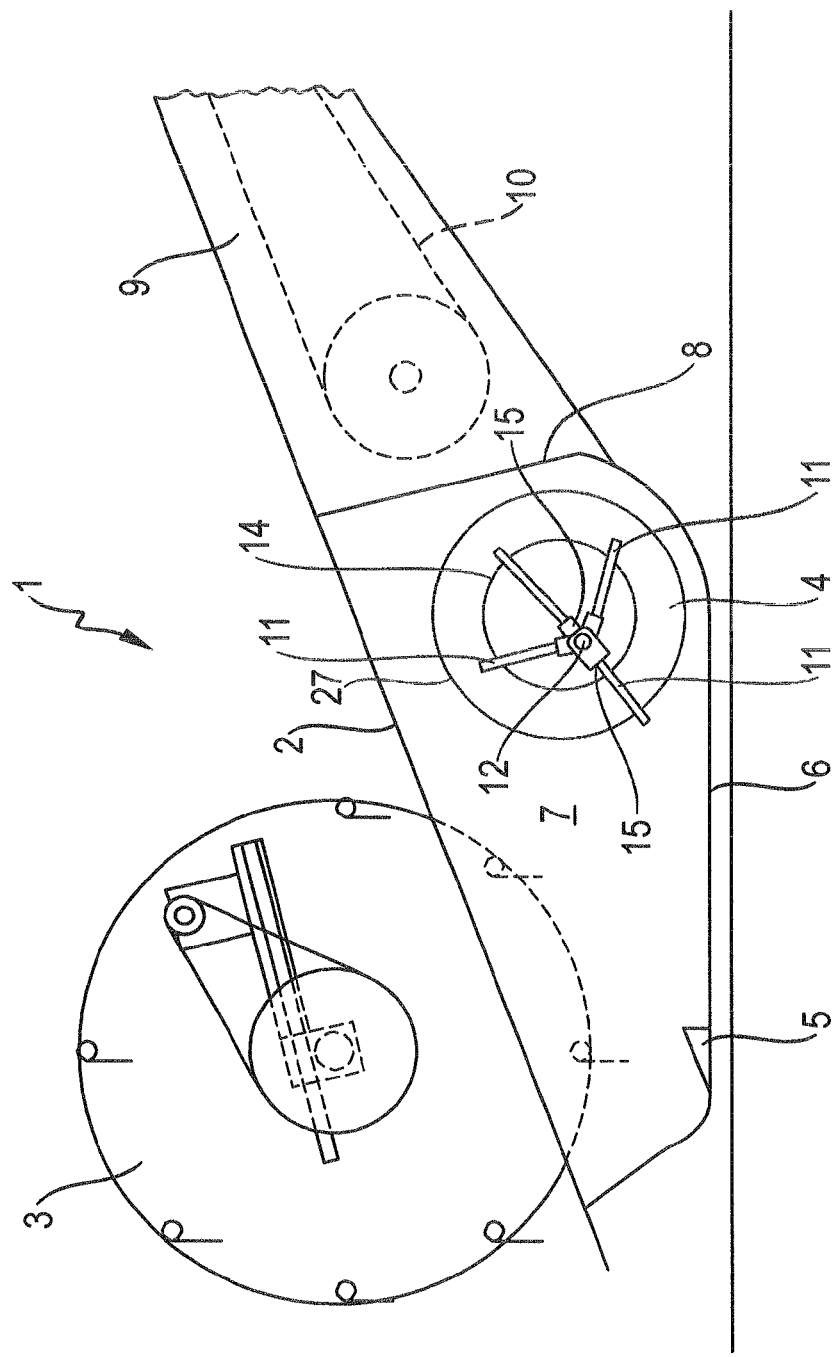
FIG. 1 presents a schematic cross-sectional view of a header of a combine harvester having feeder aids supported on a control shaft.

The present invention is described by reference to the example of the application on a header 1 of a combine harvester. The schematic depiction in FIG. 1 shows a cross-sectional view of a header 1. The header 1 substantially comprises a frame 2, a reel 3, a conveyor device 4 designed as a header auger and a knife 5. The frame 2 comprises a bottom panel 6, the two opposing side panels 7 and a rear panel 8. The crop is captured by the reel 3 and is directed to the knife 5 and is cut thereby. The cut crop is conveyed from both sides by the conveyor device 4 via auger flights 27 in the direction toward the middle of the header 1 and, from there, is transferred to a feeder housing 9. The feeder housing has a feed rake 10 that conveys the crop further to a threshing unit of the combine harvester.

Figure 2:
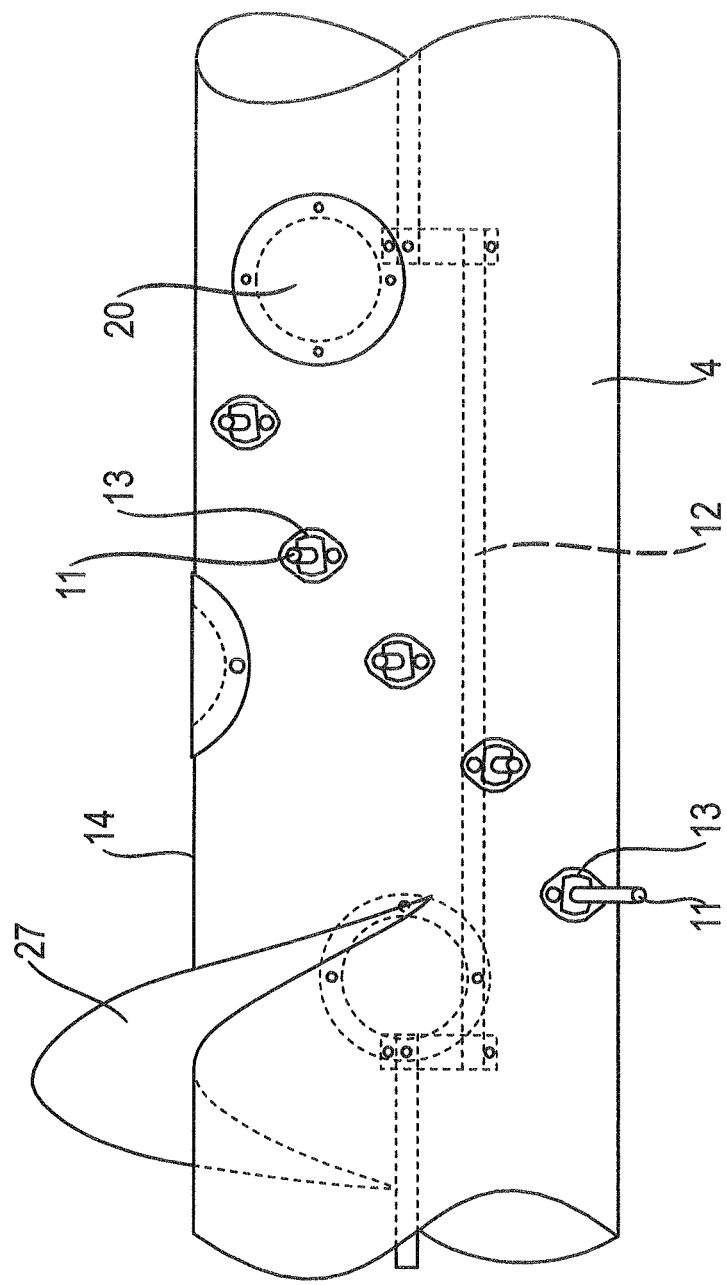
FIG. 2 presents a partial view of a conveyor device from the front.

The transfer of the crop from the conveyor device 4 to the feeder housing 9 is supported by the controlled feeder aids 11 disposed in the central region of the conveyor device 4. The feeder aids 11 are supported on a control shaft 12, which is disposed eccentrically within the header auger 4. Guides 13 are disposed in the jacket 14 of the conveyor device 4, through which the free ends of the feeder aids 11 can be moved and engage in the crop and convey this crop in the direction toward the feeder housing 9 (as depicted in FIG. 2). The individual feeder aids 11 are disposed on a swivel bearing 15, which encloses the control shaft 12.

FIG. 2 shows a partial view of the conveyor device 4, which is designed as a header auger, from the front. The central region of the conveyor device 4, which is bordered by the auger flights 27 and in which the feeder aids 11 are disposed, comprises service openings. The service openings are closed by covers 20. The feeder aids 11 and the swivel bearing 15 in the interior of the conveyor device 4 are accessible through these service openings.

Figure 3:
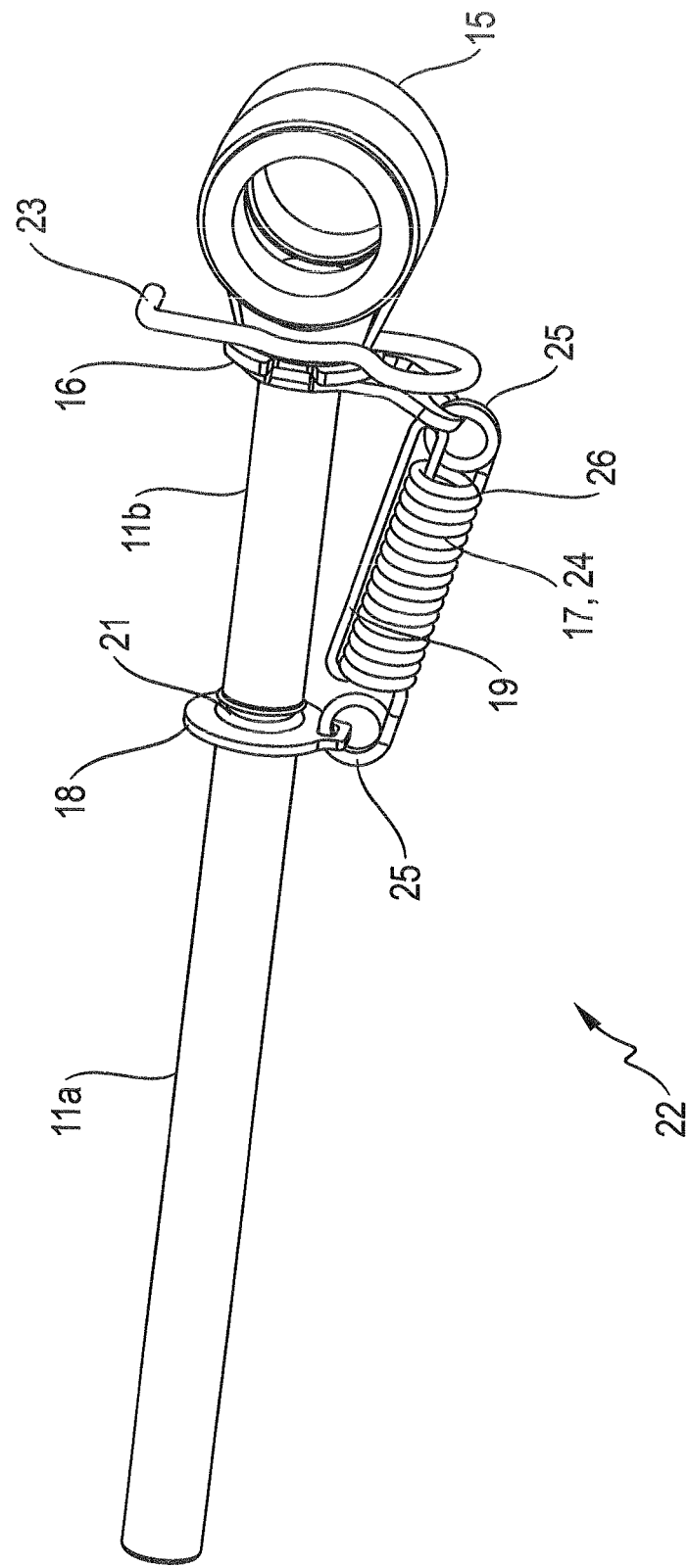
FIG. 3 presents a perspective view of the driving device for a conveyor device according to FIG. 2.

FIG. 3 shows a perspective view of a driving device 22 for a conveyor device 4 according to FIG. 2. The driving device 22 comprises a feeder aid 11, which is supported at one end in the swivel bearing 15 on the control shaft 12. The feeder aid 11 is affixed by means of a cotter pin 23, which extends through the swivel bearing 15 and the feeder aid 11. A first fastening section 16 is disposed adjacent to the swivel bearing 15. A predetermined breaking point 21 is located in the direction of the free end of the feeder aid 11 that is used to break the feeder aid 11 into two feeder aid parts 11a and 11b in the event that a threshold value for a force exerted on the feeder aid 11 is exceeded. Doing so prevents the feeder aid 11 from bending due to the external force exerted thereupon. If the feeder aid 11 would bend, the conveyor device 4 could be blocked as the feeder aid 11 could no longer be drawn into the interior by the eccentric control shaft 12. The feeder aid 11 would have to be replaced immediately, which would interrupt the harvesting process.

Furthermore, a second fastening section 18 is disposed on the free end of the feeder aid 11 and is located behind the predetermined breaking point 21 relative to the first fastening element 16. A resiliently elastic connecting element 17 is disposed on the first fastening section 16 and the second fastening section 18. This connecting element extends in the longitudinal direction of the feeder aid 11 between the first fastening section 16 and the second fastening section 18. the resiliently elastic connecting element 17 is loaded in tension due to centrifugal forces if the feeder aid 11 breaks apart at the predetermined breaking point 21.

The connecting element 17 is preferably designed as a helical tension spring 24 having a plurality of coils 26, wherein the eyelets 25 disposed on the ends thereof are used for fastening on the fastening sections 16 and 18. The spring travel or the deflection of the resiliently elastic connecting element 17 is limited by a limiting element 19. The limiting element 19 extends substantially parallel to the load direction of the connecting element 17. The limiting element 19 encloses the connecting element 17 at least in sections.

In the exemplary embodiment shown, the limiting element 19 has a substantially oval, annular contour. This extends through the interior of the helical spring 24 and encloses the spring coils 26 of the helical tension spring 24 on the inner side and the outer side.

It is also feasible for a limiting element 19 to enclose the spring coils 26 only in sections, for example, in the case of a substantially C-shaped embodiment of a limiting element 19 (see FIG. 4). The C-shaped limiting element 19 extends through the interior of the helical spring 24 and encloses the spring coils 26 of the helical spring 24 at the ends only in sections. The limiting element 19 must be dimensioned in a suitable manner to ensure that this can absorb the tensile forces that can result in an overstretching of the connecting element 17.

The length of the limiting element 19 exceeds the range that is decisive for the effective spring travel of the connecting element 17. In the case of the helical tension spring 24, the limiting element 19 extends at least beyond the length of the section having spring coils 26. The limitation of the spring travel of the connecting element 17 by the limiting element 19 is used, in the event that the feeder aid 11 breaks, to prevent the broken-off feeder aid part 11a from moving outwardly in the radial direction due to the centrifugal force. This broken-off feeder aid part is held by means of the second fastening section 18 thereof on the inner side of the jacket 14. In addition, an overstretching of the connecting element 17 due to the broken-off feeder aid 11a becoming stuck in the interior of the conveyor device 4 can be avoided.

During operation of the conveyor device 4, the feeder aids 11 supported on the control shaft 12 (which is eccentrically disposed in the interior of the conveyor device 4), are located in different positions in the radial direction. The feeder aids 11 extend beyond the guides 13 further on the side of the conveyor device 4 facing the crop to be conveyed than on the side facing away from the crop.

If, for example, a foreign object in the crop stream causes one of the feeder aids 11 to break at the predetermined breaking point 21 thereof, the broken-off feeder aid part 11a is accelerated outwardly in the radial direction due to the centrifugal force. This broken-off feeder aid part 11a is prevented from escaping through the guide 13 by the second fastening element 18, which is designed as an annular disk. While the feeder aid part 11b disposed on the swivel bearing 15 is drawn into the interior of the conveyor device 4 due to the rotation of the conveyor device 4, the broken-off feeder aid part 11a is held by the tensioning element 19 and is drawn back into the interior of the conveyor device 4.

In an embodiment of the connecting element as a tension band, this is designed parallel to the connecting element. In this case, the tension band extends between the eyelets 25 located on the ends and could be connected thereto. Preferably, the tension band has a length that is greater than the length of the section that is effective for a deflection of the connecting element.

LIST OF REFERENCE SIGNS 1 header
2 frame
3 reel
4 conveyor device
5 knife
6 bottom panel
7 side panels
8 rear panel
9 feeder housing
10 feed rake
11 feeder aid
12 control shaft
13 guide
14 jacket
15 swivel bearing
16 first fastening section
17 connecting element
18 second fastening section
19 limiting element
20 cover
21 predetermined breaking point
22 driving device
23 cotter pin
24 helical tension spring
25 eyelet
26 spring coil
27 auger flights As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

The invention claimed is:

1. A driving device (22) of a conveyor device (4), comprising;
a feeder aid (11) disposed in an interior of the conveyor device (4),
a swivel bearing (15) for supporting the feeder aid (11) on a control shaft (12),
a first fastening section (16) assigned to the swivel bearing (15), and
a second fastening section (18), which is disposed at a distance from the first fastening section (16), between which a predetermined breaking point (21) is disposed on the feeder aid (11),
wherein the first fastening section (16) and the second fastening section (18) are interconnected by a resiliently elastic connecting element (17), which embodies a helical tension spring (24).

2. The driving device (22) according to claim 1, wherein a spring travel of the connecting element (17, 24) is limited by a limiting element (19).

3. The driving device (22) according to claim 2, wherein the limiting element (19) has a length that corresponds at least to a length of the section that is effective for a deflection of the connecting element (17, 24).

4. The driving device (22) according to claim 2, wherein the limiting element (19) extends substantially parallel to the connecting element (17, 24).

5. The driving device (22) according to claim 2, wherein the limiting element (19) encloses spring coils (26) of the helical tension spring (24), at least in sections.

6. The driving device (22) according to claim 2, wherein the limiting element (19) has a substantially C-shaped contour.

7. The driving device (22) according to claim 2, wherein the limiting element (19) has a substantially oval, annular contour.

8. The driving device (22) according to claim 1, wherein the second fastening section (18) is an annular disk disposed coaxially to the feeder aid (11).

9. The driving device (22) according to claim 1, wherein the conveyor device (4) is an intake finger assembly of an auger of a harvesting device.

10. An agricultural harvesting machine, comprising a conveying device (4) configured with a driving device (22), the driving device (22) comprising:
a feeder aid (11) disposed in an interior of the conveyor device (4),
a swivel bearing (15) for supporting the feeder aid (11) on a control shaft (12),
a first fastening section (16) assigned to the swivel bearing (15), and
a second fastening section (18), which is disposed at a distance from the first fastening section (16), between which a predetermined breaking point (21) is disposed on the feeder aid (11),
wherein the first fastening section (16) and the second fastening section (18) are interconnected by a resiliently elastic connecting element (17), which embodies a helical tension spring (24).

* * * * *